United States Patent [19]

Beaulieu

[11] Patent Number: 4,678,271
[45] Date of Patent: Jul. 7, 1987

[54] APPARATUS FOR ALIGNING A FIBER AND A DEVICE

[75] Inventor: Andre R. Beaulieu, Pincourt, Canada
[73] Assignee: RCA Corporation, Princeton, N.J.
[21] Appl. No.: 844,137
[22] Filed: Mar. 26, 1986
[51] Int. Cl.[4] .................................................. G02B 6/42
[52] U.S. Cl. .................................. 350/96.20; 29/464; 250/227; 269/88; 269/287; 357/74
[58] Field of Search ...................... 350/96.20; 250/227; 357/74, 84; 29/464, 466, 467; 269/86, 88, 90, 92, 140, 287

[56] References Cited

U.S. PATENT DOCUMENTS

| | | | |
|---|---|---|---|
| 3,938,895 | 2/1976 | Bridger et al. | 350/96.20 X |
| 3,999,841 | 12/1976 | Dakss et al. | 350/96.20 X |
| 4,233,619 | 11/1980 | Webb et al. | 357/74 |
| 4,333,705 | 6/1982 | Mead | 350/96.20 |
| 4,394,061 | 7/1983 | Schroeder | 350/96.20 |
| 4,433,898 | 2/1984 | Nasiri | 350/96.20 X |

Primary Examiner—John Lee
Attorney, Agent, or Firm—Raymond A. Eckersley

[57] ABSTRACT

An apparatus for providing and maintaining the alignment between a fiber and a device during the bonding of the fiber to the device and the subsequent assembly of a housing thereover is disclosed. The apparatus comprises a base, including means for holding the device, adjustably connected to a first support. A lower fiber holding means is attached to the first support such that it extends over the device holding means. An upper fiber holding means is attached to a second support which extends over the lower holding means. Means are also provided for securing the device housing above the lower fiber holding means.

6 Claims, 3 Drawing Figures

APPARATUS FOR ALIGNING A FIBER AND A DEVICE

This invention relates to an apparatus used in the fabrication of a pigtailed device assembly and more particularly concerns an apparatus used to align and support a fiber and device during such fabrication.

BACKGROUND OF THE INVENTION

Optoelectronic devices such as detectors and emitters are conventionally fabricated as assemblies comprising a device affixed to a header wherein the mounted device is coupled to a short length of optical fiber called a pigtail. Since the efficiency of an optical communications system is directly linked to the amount of light coupled between a device and fiber, precise alignment of these two elements is crucial. The fabrication of pigtailed device assemblies greatly facilitates the accurate incorporation of these devices into optical communications systems.

In the fabrication of pigtailed device assemblies it is common to employ a fixture capable of holding the mounted device and fiber which fixture has means for adjusting the position of one element relative to the other. Due to the flexibility of the fiber, the fixture must clamp the fiber very near the end adjacent the device during alignment and bonding. Therefore, in applications where a housing or fiber support is to be slid down over the fiber onto the header, it is necessary for the housing to be above the clamping means during initial attachment of the fiber to the device. This in turn means that the clamping means must be released and the housing maneuvered down onto the header for further assembly. Although the fiber is not released until it has been bonded to the device, the subsequent assembly steps can strain or break the fiber prior to the time the housing or support structure is put into place. A fixture for providing an accurate, efficient alignment and bond of a fiber to a device with minimal fiber breakage has been sought.

SUMMARY OF THE INVENTION

An apparatus for providing and maintaining the alignment between a fiber and a device during the bonding of the fiber to the device and the subsequent assembly of a housing thereover is disclosed. The apparatus comprises a base, including means for holding the device, adjustably connected to a first support. A lower fiber holding means is attached to the first support such that it extends over the device holding means. An upper fiber holding means is attached to a second support which extends over the lower holding means. Means are also provided for securing the device housing above the lower fiber holding means.

DETAILED DESCRIPTION OF THE PREFERRED EMBODIMENT

Figure 1:
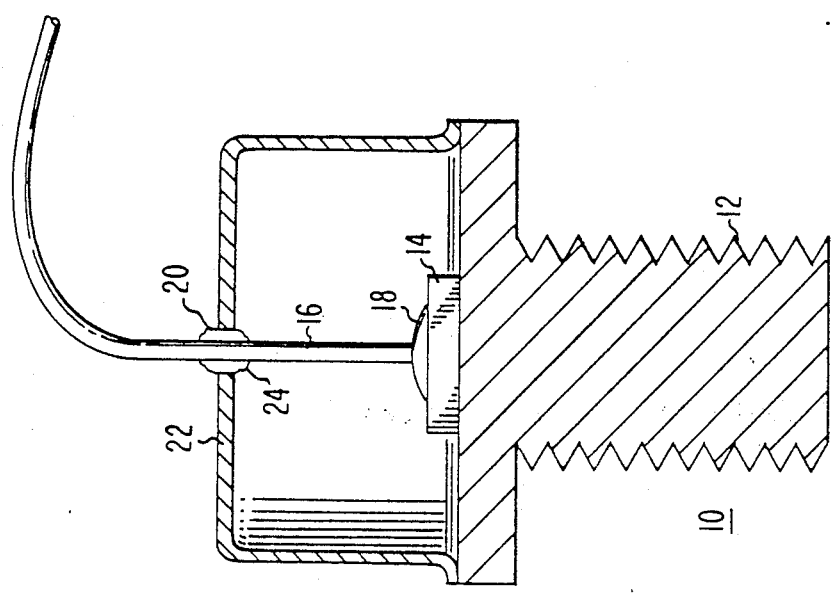
FIG. 1 is a cross section of a pigtailed device assembly of the type fabricated by the apparatus of the present invention.

A typical pigtailed device assembly 10 is illustrated in FIG. 1 comprising a header 12 onto which a device 14, e.g. a laser, LED, or photodetector, is mounted. A length of optical fiber 16 is connected to the device 14 by the bonding material 18, which provides the alignment of the device 14 to the fiber 16 and which can be of any suitable material such as a transparent epoxy. The fiber 16 extends through an aperture 20 in the housing 22 which encloses the mounted device 14. A second bond 24 is formed at this aperture 22 to seal the assembly 10 and give stability to the fiber 16. Alternatively, the housing 22 may have a larger aperture 20 and a support sleeve (not shown) may be slid down over the fiber 16 to support the fiber 16 and seal the assembly 10.

Figure 2:
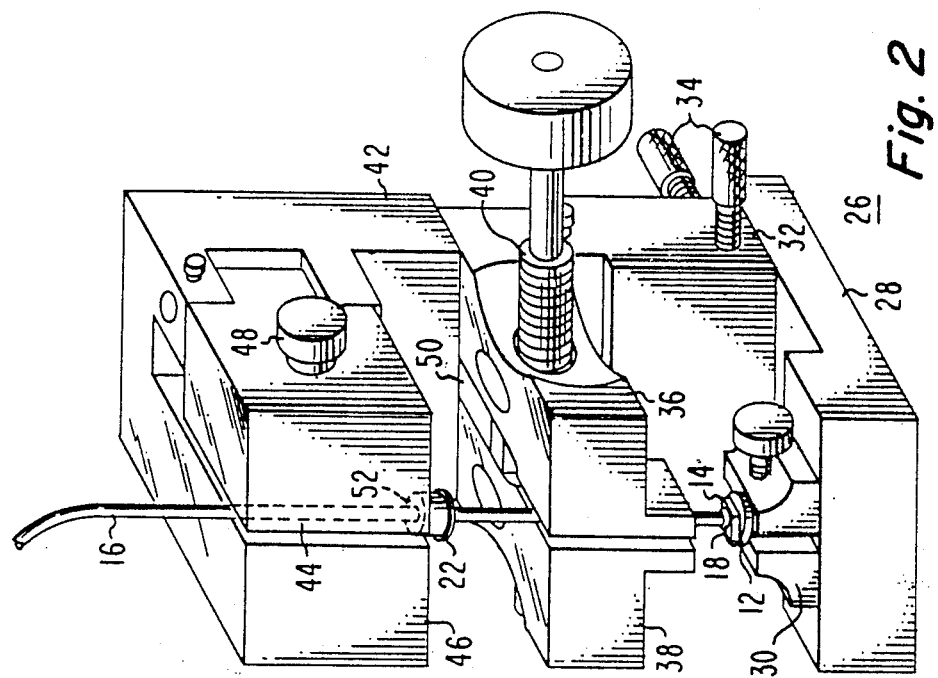
FIG. 2 is an illustration of the apparatus of the present invention.

The apparatus 26 of the present invention used in the fabrication of such an assembly 10 is illustrated in FIG. 2 and comprises a base 28 with a device chuck 30 for supporting a header mounted device. A first support 32 is attached to the base 28 by a translator means (not shown) and micromanipulators 34 are provided to adjust the relative position between the base 28 and first support 32 preferably in the x, y and z directions. A pair of lower jaws 36 and 38 are pivotally connected to the first support 32 and extend therefrom such that the jaws 36 and 38 are over and vertically spaced from the device chuck 30. An adjusting screw 40 for opening and closing the lower jaws 36 and 38 is also provided. A second support 42 overlies and is connected to the non-opening end of the lower jaws 36, 38. A pair of upper jaws 44 and 46 extend from the second support 42 such that they are over and vertically spaced from the lower pair of jaws 36, 38. The first upper jaw 44 is pivotally mounted to the second support 42 and the second upper jaw 46 is integral with the second support 42. A second screw 48 for opening and closing the upper jaws 44 and 46 is provided. An alignment element 50, comprising a body attached to or integral with the first support 32, is located between the lower jaws 36, 38 and is aligned with the non-pivoting upper jaw 46 such that the lower jaws 36, 38 and the upper jaws 44, 46 are in precise alignment with each other, i.e. on a common axis, when in a closed position. A recess 52 is provided partially in each of the upper pair of jaws 44 and 46 and a magnet (not shown) is attached in the top of that portion of the recess 52 within the non-pivoting upper jaw 46. The recess 52 is of a shape and size to secure a device assembly housing and is positioned so as to be on a common axis with a fiber held by the jaws 36, 38, 44, 46.

Figure 3:
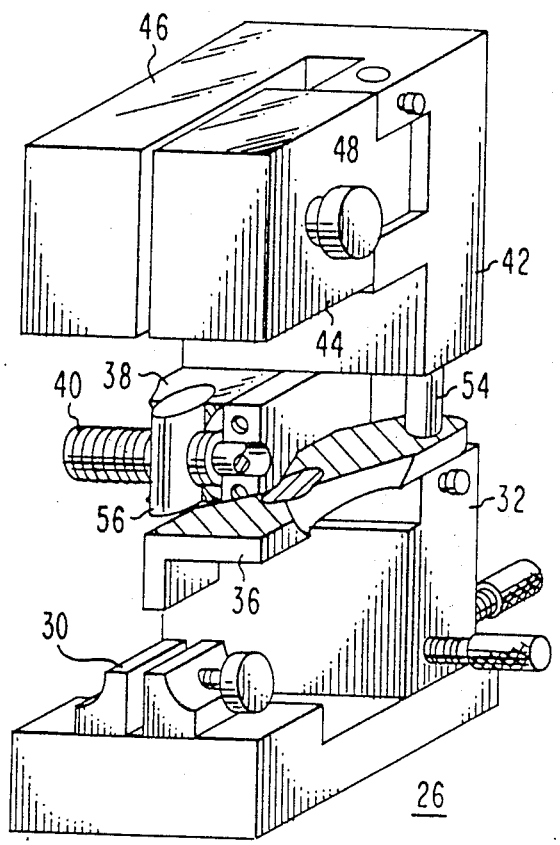
FIG. 3 is a partial cross section of the apparatus of the present invention.

The partial cross sectional view in FIG. 3 more clearly illustrates this embodiment of the present apparatus 26. The first lower jaw 36 has been horizontally cut away to show a pin 54 which extends from the first support 32 through the lower jaw 36 and into second support 42. This arrangement provides the connection of the first and second supports 32, 42 and enables the first lower jaw 36 to pivot. Additional pins (not shown) are similarly arranged in the second lower jaw 38 and the first upper jaw 44 to allow these parts to pivot as well.

The second lower jaw 38 has been vertically cut away to expose a threaded retainer pin 56 which extends vertically through the jaw 38. A similar retainer pin (not shown), is positioned within the first lower jaw 36. The adjusting screw 40 is threaded in a different direction through each of these retainer pins such that when it is turned, the lower jaws 36, 38 will move concurrently in opposite directions, i.e. they will open or close together. Similarly, the second screw 48 is threaded through the first upper jaw 44 such that when the screw 48 is turned, the first upper jaw 44 will separate from, or close on, the second upper jaw 46.

All of the parts of the apparatus 26 are precisely machined, typically of metal, e.g. aluminum, stainless steel and the like. The jaws 36, 38, 44, 46 are shown to be pivotally mounted but may be slidably connected to the support 32 so as to separate along their entire length. The jaws 36, 38, 44, 46 should contact the fiber along at least about 0.2 inches (5 millimeters) and preferably 0.5 inches (12.5 millimeters) or more of its length so as to provide precise alignment. Although the translator means with micromanipulators 34 are shown to interconnect the base 28 and the first support 32, the means for adjusting the relative position between these two members can be located at or near the device chuck 30. Also, alternative means for holding the device, fiber and housing may be employed without departing from the spirit of the present invention. Further, although shown to be used in a vertical arrangement, the apparatus 26 could easily be adapted for use in a horizontal plane.

Referring back to FIG. 2, to use the apparatus 26 of the present invention, a header 12 with a device 14 affixed thereto is secured in the device chuck 30. A length of optical fiber 16 and a housing 22 are positioned between the lower jaws 36 and 38 and the upper jaws 44 and 46 such that the housing 22 is secured within the recess 52 and can be readily maneuvered down the fiber 16 and onto the header 12. The jaws 36, 38, 44, 46 are closed onto the fiber 16. A this point the alignment element 50 insures that the pairs of jaws are in alignment with each other so that no strain is put on the fiber 16 when the jaws are closed. Then the micromanipulators 34 are employed to position the fiber 16 and device 14 for proper alignment which can be determined by methods known in the art. These methods typically involve physical location of the fiber 16, vis-a-vis the device 14 and/or passing light into, or out of, the fiber 16 to determine the amount of light Coupled therebetween.

When the desired alignment has been achieved the fiber 16 can be bonded to the device 14, e.g. by epoxy. Thereafter, the lower jaws 36 and 38 must be opened so that the housing 22 can be maneuvered down the fiber 16 and onto the header 12 for attachment thereto. The housing 22 is conventionally soldered, welded, brazed or epoxied to the header 12. Since the upper jaws 44 and 46 are still closed, they support the fiber 16 and the delicate bond 18. In the prior art, the fiber holding means are released at this point and misalignment or breakage of the fiber can occur, considering the sheer weight and force that the flexible length of fiber can exert on the bond to the device.

Once the housing 22 is down on the header 12, the second bond 24 shown in FIG. 1 can be formed. This bond 24 provides substantially greater physical support to the fiber 16 whereas the primary function of the first bond 18 is to maintain alignment. Alternatively, if the housing 22 has a larger aperture 20, the housing 22 can be attached to the header 12 prior to bonding the fiber 16 to the device 14. In this case, a support sleeve can be substituted for the housing 22 in the above-described operation of the apparatus 26 of the present invention.

The present invention is particularly well suited for use in the fabrication of photodetectors, however, other optoelectronic device assemblies, e.g. those of lasers and LEDs, will also benefit from the present invention. The present invention provides more reliable device-to-fiber alignment with substantially reduced fiber breakage in the fabrication of pigtailed device assemblies.

I claim:

1. An apparatus for providing and maintaining the alignment between a device and a fiber during the bonding of the fiber to the device and and assembly of a housing thereover, comprising
    a base, including means for supporting said device;
    a first support connected to said base including means for adjusting the relative position between said base and said first support;
    a lower fiber holding means mounted on said first support such that said lower holding means is vertically spaced from, and extends over said device support means;
    a second support extending vertically from said lower fiber holding means;
    an upper fiber holding means mounted on said second support such that said upper holding means is vertically spaced from, and extends over said lower holding means; and
    an alignment element to maintain alignment between said lower and upper fiber holding means; and
    releasable means for securing said housing above the lower holding means.

2. The apparatus of claim 1 wherein said lower fiber holding means comprises a lower pair of jaws pivotally mounted on said first support and wherein said upper fiber holding means comprises an upper pair of jaws, at least one of which is pivotally mounted on said second support.

3. The apparatus of claim 2 wherein each jaw is of a sufficient size to contact a fiber along at least about 5 mm of its length.

4. The apparatus of claim 2 further comprising an alignment element comprising a body integral with the first support located between the lower pair of jaws such that the lower and upper jaws are aligned along a common axis when closed.

5. The apparatus of claim 1 wherein said means for securing the housing comprises a recess within the upper fiber holding means positioned such that a fiber held by said upper holding means can pass through the housing within the recess.

6. The apparatus of claim 5 wherein a magnet is affixed within said recess for holding said housing.

* * * * *